United States Patent
Cui

(10) Patent No.: US 10,419,425 B2
(45) Date of Patent: Sep. 17, 2019

(54) METHOD, DEVICE, AND SYSTEM FOR ACCESS CONTROL OF A CLOUD HOSTING SERVICE

(71) Applicant: Alibaba Group Holding Limited, George Town (KY)

(72) Inventor: Jie Cui, Hangzhou (CN)

(73) Assignee: Alibaba Group Holding Limited (KY)

( * ) Notice: Subject to any disclaimer, the term of this patent is extended or adjusted under 35 U.S.C. 154(b) by 212 days.

(21) Appl. No.: 15/251,749

(22) Filed: Aug. 30, 2016

(65) Prior Publication Data

US 2017/0063836 A1    Mar. 2, 2017

(30) Foreign Application Priority Data

Sep. 1, 2015 (CN) .......................... 2015 1 0555586

(51) Int. Cl.
| | |
|---|---|
| *H04L 29/06* | (2006.01) |
| *H04L 29/08* | (2006.01) |
| *G06Q 30/06* | (2012.01) |

(52) U.S. Cl.
CPC ........ *H04L 63/083* (2013.01); *H04L 63/0884* (2013.01); *G06Q 30/0601* (2013.01); *H04L 67/10* (2013.01)

(58) Field of Classification Search
CPC .............. G06Q 30/0601; H04L 63/083; H04L 63/0884; H04L 67/10; H04L 67/2819
See application file for complete search history.

(56) References Cited

U.S. PATENT DOCUMENTS

| | | | |
|---|---|---|---|
| 9,148,429 B2 | 9/2015 | Cairns et al. | |
| 2003/0061520 A1 | 3/2003 | Zellers et al. | |
| 2005/0193205 A1* | 9/2005 | Jacobs ................... | G06F 21/10 |
| | | | 713/176 |
| 2009/0178109 A1 | 7/2009 | Nice et al. | |
| 2009/0199276 A1 | 8/2009 | Schneider | |
| 2009/0313363 A1 | 12/2009 | Parsons et al. | |
| 2010/0076863 A1 | 3/2010 | Golomb | |
| 2011/0126168 A1 | 5/2011 | Ilyayev | |
| 2011/0126197 A1 | 5/2011 | Larsen et al. | |
| 2011/0202988 A1 | 8/2011 | Otranen | |
| 2011/0277027 A1 | 11/2011 | Hayton et al. | |
| 2011/0314533 A1 | 12/2011 | Austin et al. | |

(Continued)

*Primary Examiner* — Abiy Getachew
(74) *Attorney, Agent, or Firm* — Van Pelt, Yi & James LLP

(57) ABSTRACT

Embodiments of the present application relate to a method and device for access control of a cloud hosting service. The method includes receiving a first authentication request from a client, performing a first authentication of the first account information, in the event that the first authentication is successful, generating an authentication password and communicating the authentication password to the client, receiving a second authentication request from a proxy server, wherein the second authentication request comprises the authentication password transmitted to the proxy server by the client, performing a second authentication of the authentication password and causing the proxy server to request the cloud host to perform a third authentication of second account information, and in the event that the third authentication is successful, causing the client to access one or more service resources deployed on the cloud host via the proxy server.

21 Claims, 9 Drawing Sheets

(56) References Cited

U.S. PATENT DOCUMENTS

| | | |
|---|---|---|
| 2012/0042216 A1 | 2/2012 | Blubaugh |
| 2012/0096271 A1 | 4/2012 | Ramarathinam et al. |
| 2013/0086670 A1 | 4/2013 | Vangpat et al. |
| 2013/0212661 A1 | 8/2013 | Neafsey et al. |
| 2014/0040628 A1 | 2/2014 | Fort et al. |
| 2014/0101434 A1 | 4/2014 | Senthurpandi et al. |
| 2014/0189808 A1* | 7/2014 | Mahaffey ............ H04L 63/083 726/4 |
| 2014/0298486 A1* | 10/2014 | Robertson ............ G06F 21/10 726/28 |
| 2014/0317716 A1 | 10/2014 | Chao et al. |
| 2015/0121502 A1* | 4/2015 | Kawabata ............ H04L 67/28 726/8 |
| 2015/0135302 A1 | 5/2015 | Cohen |
| 2015/0142666 A1 | 5/2015 | Landrok et al. |

\* cited by examiner

METHOD, DEVICE, AND SYSTEM FOR ACCESS CONTROL OF A CLOUD HOSTING SERVICE

CROSS REFERENCE TO OTHER APPLICATIONS

This application claims priority to People's Republic of China Patent Application No. 201510555586.2 entitled A PRIVILEGE CONTROL METHOD, DEVICE AND SYSTEM FOR CLOUD HOSTED SERVICES filed Sep. 1, 2015 which is incorporated herein by reference for all purposes.

FIELD OF THE INVENTION

The present application relates to the field of cloud security technology. In particular, the present application relates to a method, a device, and a system for controlling privileges for cloud hosting services.

BACKGROUND OF THE INVENTION

An endless variety of demands on electronic transaction web sites has attracted a large number of Independent Software Vendors (ISVs), which has led to an increasing enrichment of the range of e-commerce-related products being developed and used.

In the e-commerce cloud environment, ISVs purchase cloud hosts (e.g., use Amazon Web Services™, Microsoft Cloud™, etc.) and use the business accounts of transaction websites to obtain high-value commercial data from transaction website open platforms (e.g., the Taobao Open Platform (TOP)). However, when services (e.g., e-commerce services) are deployed on cloud hosts based on this high-value commercial data and access is provided to wide area networks, the account system of the service itself (e.g., service accounts) is what is being used (e.g., accessed) in connection with providing the e-commerce service. According to conventional art, security capabilities for these service accounts are weak (e.g., insecure) in comparison to business accounts on transaction websites.

For example, for services managed remotely (e.g., Windows remote desktop or Linux SSH), using such means as brute force cracking, enumerator or weak password attempts, hackers are able to invade cloud hosts directly to perform illegal operations and steal data. As another example, for services managed by website back ends, there is a similar risk that website account systems can be hacked. These services are also subject to various types of web attacks, such as Structured Query Language (SQL) injection, Cross Site Scripting (XSS) attacks, and file upload attacks.

Once a cloud hosting service is successfully invaded by a hacker, there is a risk of data leaks and even deletion of data logs such as the remote logon log. In the event of a successful attack, after destruction of logs is complete, the activities can become difficult to trace. In addition, because the service accounts and the business accounts are not associated, investigations into suck attacks are difficult.

According to conventional art, host security issues are generally resolved by using firewalls. For example, the system firewall can be configured using settings that restrict access to the services of a designated port to designated IP addresses. The client uses an authorized IP address to transmit a request to the cloud host, whereupon account system authentication of the service itself is performed. When authentication is passed, the service can be used normally. Although such a solution to host security issues reduces the scope of potential attacks, the security of the account system of the cloud hosting service itself is not strengthened. Additionally, because client IP addresses often change and multiple clients may share the same IP, the configuration of system firewall rules to restrict access to the services of a designated port to designated IP addresses reduces the flexibility of service privilege controls, and results in insufficient control granularity.

BRIEF DESCRIPTION OF THE DRAWINGS

Various embodiments of the invention are disclosed in the following detailed description and the accompanying drawings.

By reading the detailed description below of a preferred implementation method, the various other advantages and benefits will become clear to persons with ordinary skill in the art. The drawings are merely intended to show the purposes of the preferred implementation methods, and should not be considered as limiting the present application. Moreover, throughout the drawings, the same reference symbols are used to indicate the same parts. Among the drawings.

DETAILED DESCRIPTION

Figure 1:
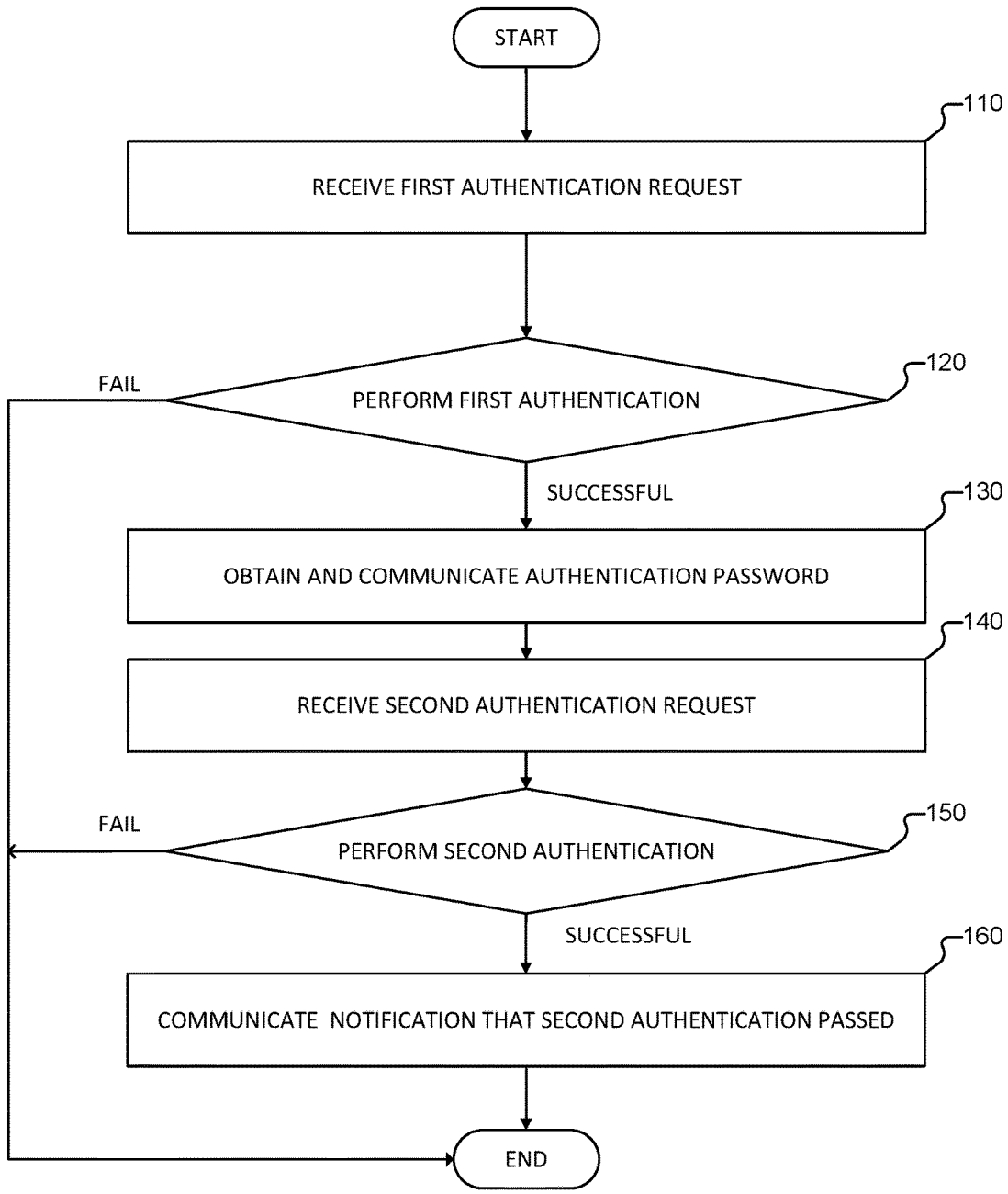
FIG. 1 is a flowchart of an access control method for cloud hosting services according to various embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a client generally refers to a device used (e.g., by a user) within a network system and used to communicate with one or more servers. According to various embodiments of the present disclosure, a client includes components that support communication functionality. For example, a client can be a smart phone, a tablet device, a mobile phone, a video phone, an e-book reader, a desktop computer, a laptop computer, a netbook computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a smart home appliance, or the like. In some embodiments, a web browser and/or a standalone application is installed at each client, enabling a user to access a service (e.g., an e-commerce website, a software-as-a-service, etc.) hosted by one or more servers.

As used herein, a cloud hosting is deployed in a cloud computing platform. For example, cloud hosting includes the integration of computing, storage, and network resources to provide on-demand service. The cloud hosting may be charged to users leveraging cloud hosting to provide services. Cloud hosting provides a high degree of reliability, high performance, and flexible expansion characteristics of IT infrastructure.

As used herein, a cloud hosting service runs on a cloud host. For example, the cloud hosting service is provided via cloud hosting. The cloud hosting service provides specific functionality through the network for the user application. The cloud hosting service can include software provided as a Software-as-a-Service (SaaS).

In some embodiments, the client can be a software client deployed on a terminal corresponding to a server, with local services provided to the terminal via communication with the server. In some embodiments, the client can be a single application client customized for use in a specific environment, with services provided by hardware functions of the client itself. For example, the client can be a POS machine, an embedded industrial computer, the receiver of a subscriber in a radio paging system, etc.

FIG. 1 is a flowchart of an access control method for cloud hosting services according to various embodiments of the present disclosure.

Referring to FIG. 1, process 100 for access control for cloud hosting services is provided. Process 100 can be implemented by a device such as a computing device. In some embodiments, process 100 is implemented by an authenticating server. Process 100 can be implemented by device 500 of FIG. 5, system 800 of FIG. 8, and/or computer system 900 of FIG. 9. Process 100 can be implemented in connection with process 200 of FIG. 2.

Figure 2:
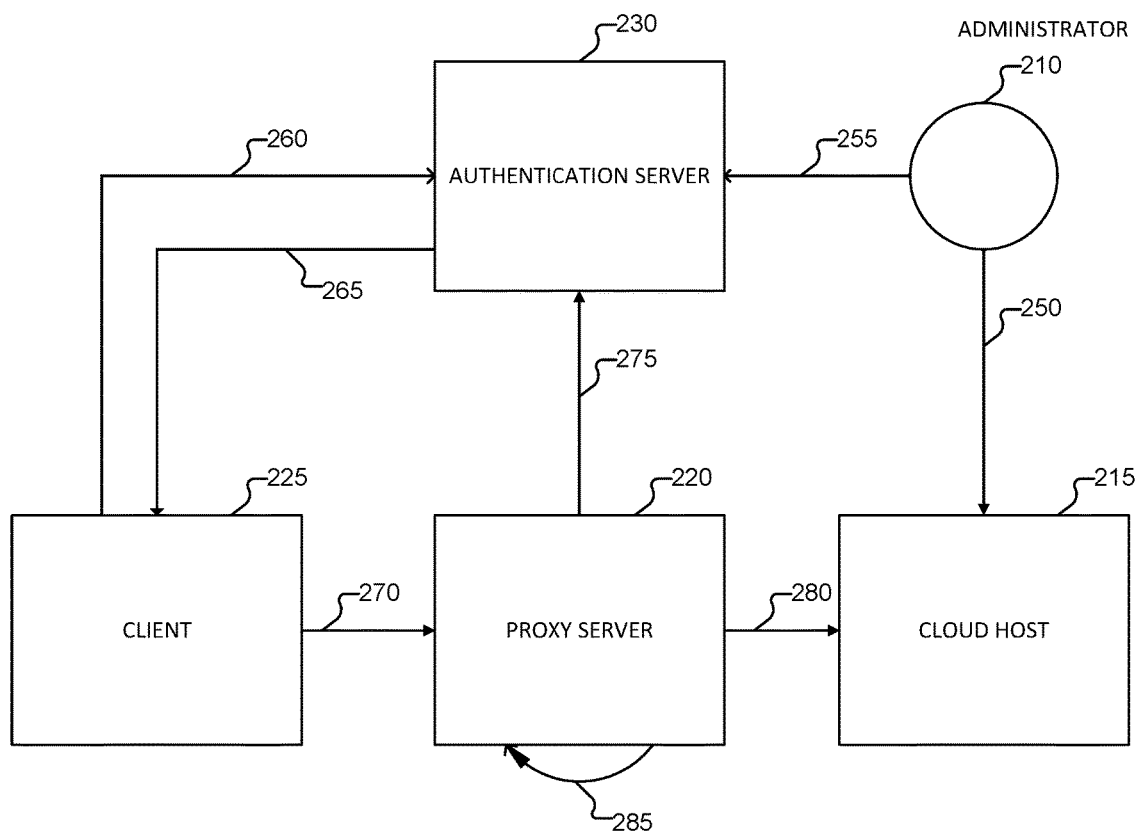
FIG. 2 is a flowchart of an access control method for cloud hosting services according to various embodiments of the present disclosure.

FIG. 2 is a flowchart of an access control method for cloud hosting services according to various embodiments of the present disclosure.

Referring to FIG. 2, process 200 for access control for cloud hosting services is provided. Process 200 can be implemented using a system architecture of a plurality of devices. The system architecture used to implement process 200 can include a client, a proxy server, an authentication server, and a cloud host. In some embodiments, process 200 can be implemented, at least in part, by any combination of device 500 of FIG. 5, device 600 of FIG. 6, device 700 of FIG. 7, system 800 of FIG. 8, or computer system 900 of FIG. 900.

At 110, a first authentication request is received. The first authentication request can be received by an authentication server 230. In some embodiments, the authentication server 230 receives the first authentication request from a client 225. In some embodiments, the first authentication request comprises the first account information of a software vendor. In some embodiments, the software vendor corresponds to the vendor associated with a service for which the authentication server is to authenticate the client (e.g., based at least in part on the first authentication request). The first account information can be a business account. For example, the business account is an account for an ISV (e.g., a vendor providing a software service). The authentication server 230 can correspond to a server that provides the service for which the client 225 communicates the first authentication request, or the authentication server can correspond to a server that authenticates the client 225 in connection with a service that is provided to the client by another server. The first account information can include an identifier (e.g., a login identifier, a user identifier, an account identifier, etc.), a password, a token, the like, or any combination thereof.

In some embodiments, a proxy server 220 and an authentication server 230 are deployed in connection with the client accessing the cloud host (e.g., to access a service). The proxy server 220 can be used to access the cloud host on behalf of the client 225, and the authentication server 230 can be used to perform authentication of access privileges of the client 225 when accessing the cloud host 215.

In some embodiments, a client 225 can communicate with a proxy server 220, an authentication server 230, and a cloud host 215 (e.g., a server), respectively. The client 225 can access a service deployed on the cloud host by a service provider (e.g., an ISV) via the proxy server. The proxy server 220 can communicate with the cloud host 215, the client 225, and the authentication server 230, respectively. For example, the proxy server 220 can request the authentication server 230 to perform authentication, and access the cloud host 215 on behalf of the client 225. The proxy server 220 can provide access to the cloud host 215 on behalf of the client 225 and forward or otherwise provide a service provided by the cloud host 215. The authentication server 230 can communicate with the client 225 and the proxy server 220, respectively, and can receive and process authentication requests from the client 225 and the proxy server 220.

In some embodiments, the client 225 initiates an authentication process by communicating (e.g., transmitting) a first authentication request to the authentication server 230. The first authentication request can include the first account information associated with the software vendor. The software vendor can be a software developer or other vendor (e.g., that provides or hosts a service on the cloud). The first account information associated with the software vendor can include an identifier, password, token, or the like corresponding to an account that the software vendor has registered with a service. For example, the first account information associated with the software vendor can be the business account information registered when the software vendor uses services related to electronic transactions on an electronic transaction website or other account information. For example, the first account information associated with the vendor can be a Taobao account when an ISV's business account is used in connection with providing (e.g., launching) services on the Taobao website and the services are related to Taobao or Tmall.

In some embodiments, the authentication server 230 is any applicable server or a group of multiple servers deployed in advance. For example, the server or group of multiple servers deployed as the authentication server can be configured with corresponding privilege records on the authentication server. The privilege records can include the information pertaining to accounts (e.g., business accounts, etc.) that can access the cloud hosting services. The authentication server 230 can perform authentication of the account (e.g., the business account) based at least in part on the privilege records. For example, the authentication server 230 can obtain information associated with the account corresponding to the first authentication request from an accounts database and determine whether the privilege record matches (e.g., is the same as) the information obtained from the accounts database. If the privilege record included in the first authentication request matches the information obtained from the accounts database, then the authentication server can deem authentication to be successful. In the event that the authentication server determines the authentication to be successful, the account associated with the first authentication request (e.g., business account) is permitted to access the services deployed on the cloud host 215.

Returning to FIG. 1, at 120, a first authentication is performed. The authentication server can perform the first authentication based at least in part on the first authentication request. In some embodiments, first account information can be obtained from the first authentication request (e.g., extracted from predefined fields in the authentication request message). The authentication server can perform the first authentication using at least the first account information. The authentication server can also use account information associated with an account (e.g., the client); such account information can be obtained from an account database that is stored either locally at the authentication server or remotely.

In the event that the first authentication fails, process 100 ends. For example, in the event that the authentication server determines that first account information obtained from the first authentication request is not valid (e.g., does not match a record obtained from an account database), process 100 ends. The authentication server can send a notification to the client indicating that the first authentication failed.

In the event that the first authentication passes, process 100 proceeds to 130. For example, in the event that the authentication server determines that first account information obtained from the first authentication request is valid (e.g., matches a record obtained from an account database), the authentication server proceeds to 130. The authentication server can provide a notification to the client indicating that authentication of the first account information passed.

At 130, an authentication password can be obtained and communicated. In some embodiments, the authentication password can be obtained and communicated to the client. In some embodiments, the authentication server can obtain the authentication password from a database (e.g., the authentication password can be pre-stored). In some embodiments, the authentication server can obtain the authentication password by generating the authentication password (e.g., in response to determining that the first account information is authenticated). In some embodiments, the authentication password can correspond to a unique token. Generation of the authentication password can include generating a random Universally Unique Identifier (UUID) string, and computing the authentication password using the random UUID string and the MD5 algorithm. The authentication password can be a string such as a 32-bit string (e.g., 12e086066892a311b752673a28583d3f).

After the authentication server performs authentication of the first account information, the authentication server can generate an authentication password as the basis for the successful first authentication, to be used for authentication in a second authentication process. The authentication password can be transmitted to the client. In some embodiments, the client initiates the second authentication based on the authentication password. For example, in response to receiving the authentication password, the client can initiate the second authentication and include the authentication password in the second authentication request.

At 140, a second authentication request is received. The second authentication request can be received by the authentication server. In some embodiments, the authentication server receives the second authentication request from a proxy server. The proxy server can be a server accessing a cloud host (e.g., associated with a service for which authentication of the client is performed) on behalf of the client. The second authentication request can include the authentication password. For example, in response to receiving the authentication password from the authentication server, the client can provide the proxy server with the authentication password. In some embodiments, the second authentication request can further include account information or an identifier associated with the account for which authentication in connection with access of a service is requested. In some embodiments, various other authentication elements can be included instead of, or in addition to, a password. For example, an identifier or a token can be included in the second authentication request.

At 150, a second authentication is performed. The authentication server can perform the second authentication based at least in part on the second authentication request. In some embodiments, the authentication password associated with the second authentication request can be obtained (e.g., extracted) from the second authentication request. The authentication server can perform the second authentication using at least the authentication password associated with the second authentication request.

In some embodiments, the client uses the second authentication request to transmit the authentication password to the proxy server, and the proxy server performs the second authentication with the authentication server. In some embodiments, based on whether the second authentication is successful, the proxy server determines whether the client has passed the second authentication, to serve as the basis for subsequent access of the cloud host. The proxy server can determine whether the second authentication is successful based on an authentication result based on an authentication of the second authentication request performed by the authentication server. The authentication server can communicate the authentication result to the proxy server.

In the event that the second authentication fails, process 100 can end. For example, in the event that the authentication server determines that the authentication password obtained from the second authentication request is not valid (e.g., does not match a corresponding authentication password obtained from an account database), the authentication server can end process 100. The authentication server can send a notification to the client or the proxy server that the second authentication failed.

In the event that the first authentication passes, process 100 can proceed to 160 at which a notification that the second authentication passed is communicated. For example, in the event that the authentication server determines that the authentication password obtained from the second authentication request is valid (e.g., matches authentication password obtained from an account database), the authentication server can proceed to 160. The authentication server can provide a notification to the client that authentication of the first account information passed.

In some embodiments, in the event that the second authentication is successful, the proxy server is notified so that the proxy server can request the cloud host to perform a third authentication of the second account information. In the event that the third authentication is successful, the client can access the service resources deployed on the cloud host via the proxy server. For example, the cloud host can provide to the client via the proxy server access to a service or resource hosted by the cloud host (or an associated server).

In some embodiments, the proxy server requests the authentication server to perform authentication of the authentication password (e.g., using a second authentication request), and in the event that authentication of the authentication password is successful, the proxy server receives a notification from the authentication server. In response to receiving the notification from the authentication server that authentication of the authentication password is successful, the proxy server can initiate the third authentication (e.g., by communicating a third authentication request to the cloud host). In some embodiments, the third authentication is performed by the cloud host. The cloud host can authenticate second account information of the client. In some embodiments, the second account information corresponds to the account used in connection with the client accessing internal services of the cloud host. For example, the second account information can pertain to a client account used in connection with the client accessing the internal service of the cloud host, which can be a machine account for remote logon services, a website background management account, etc. In some embodiments, the second account information includes account information for a user to access a service associated with the first account information. As an example, the first account information is the business account which the ISV uses to purchase cloud hosts on a cloud platform and the second account information is the service account information that bellows to a service being provided by the cloud host (e.g., running on the cloud host).

Permitted access (e.g., to the cloud host or services or resources hosted by the cloud host) associated with the second account information can be configured on the cloud host and stored in advance (of the authentication process). The cloud host can store second account information in advance. The second account information can be used as the basis for the performance of the third authentication of the second account information transmitted by the proxy server. In the event that authentication of the second account information corresponding to the third authentication is successful, the client can access the cloud hosting services or resources. In some embodiments, the proxy server serves as an agent (for the client) to access the cloud host. The client can send an access request to the proxy server, and the proxy server can further relay the access request to the cloud host, and relay the data returned by the cloud host to the client.

In some embodiments, the client requests the authentication server to perform the first authentication of the first account information of the software vendor; the client sends to the proxy server the authentication password returned by the authentication server in the event that the first authentication is successful; the proxy server requests the authentication server to perform the second authentication of the authentication password; in the event that the second authentication is successful, the client, via the proxy server, requests the cloud host to perform the third authentication of its second account information; and in the event that the third authentication is successful, the client can access, via the proxy server, the services or resources deployed on the cloud host. In some embodiments, the proxy server is permitted to access the cloud host through configurations on the cloud host, and before the proxy server accesses the cloud host, the authentication process includes three rounds of authentication (e.g., authentication of the software vendor's account, password authentication, and authentication of the client's account), thereby substantially strengthening the security of the cloud hosting services and the account system of the cloud host itself. The configurations on the cloud host through which the proxy server accesses the cloud host include a configuration of the cloud host's security group rule to allow the proxy servers' pubic network IP address to access the service in the cloud host. The cloud host's security group rule can be configured to only permit identified (e.g., white listed) IP addresses.

In some embodiments, the first account information corresponds to, or otherwise includes, the business account information used by the software vendor on the electronic trading platform providing the cloud host.

In some embodiments, the second account information is the service account information used by the client in connection with accessing the services deployed on the cloud host by the software vendor.

In some embodiments, the first authentication request further includes service account information and the address of the cloud hosting service to which access is being requested (e.g., a URL address, an IP address, etc.).

In some embodiments, the authentication server can extract privilege information from the first authentication request. The privilege information can include the first account information, the second account information, and the address of the cloud hosting service.

In some embodiments, the authentication server can compare the extracted privilege information to preset privilege records, and determine that the comparison results are consistent (e.g., match). The privilege records can comprise multiple groups of correspondingly saved pieces of first account information, second account information, and addresses of cloud hosting services. The privilege records can be stored in an accounts database.

The authentication server can extract privilege information, compare the privilege information to preset privilege records, and determine whether the comparison results are consistent (e.g., that the first authentication request succeeds authentication) in response to the authentication server receiving the first authentication request (e.g., at or before 120 and/or 130 of process 100 of FIG. 1).

In some embodiments, the authentication server is configured (e.g., at the time the authentication server is deployed) with a number of privilege records. Each privilege record can include information associated with a business account, an address of the cloud hosting service, and a service account. In some embodiments, the structure of each privilege record is a triad (e.g., business account, address of cloud hosting service, service account) that indicates that a business account has access privileges for one service account at one cloud hosting service address (e.g., an IP address and/or a port number). For example, the authentication server is configured with access privileges to one cloud hosting service address available to be accessed for one group of first account information and second account information. The authentication server can perform an authentication by comparing information included in a privilege record against the privilege information contained in the first authentication request. Accordingly, access control is provided with greater flexibility and granularity.

In some embodiments, the proxy server and the client communicate using the SOCKS5 protocol. Alternatively, the proxy server and the client can communicate using other protocols. SOCKS5 is a network transmission protocol located at the session layer of an Open System Interconnection (OSI) model, capable of achieving secure verification of the application layer (HTTP, FTP, RDP, SSH, etc.) and transparent transmission. Correspondingly, communication between the client and the proxy server is carried out at the session layer based on the proxy protocol.

In some embodiments, performing the second authentication of the authentication password includes determining whether the time at which the authentication password is received is within a preset time period or by a certain preset time. The preset time period or the certain preset time can be set by a system as a default setting or a system administrator. In the event that the authentication password is determined to have been received within the preset time period or by the certain preset time, then authentication of the authentication password is successful.

In some embodiments, the authentication server generates an authentication password. In connection with generating the authentication password, the authentication server can save and record a time associated with the authentication password. The time associated with the authentication password can be a time that the authentication password was generated, a time at which the authentication password expires, etc. The authentication server can save targeting authentication passwords awaiting authentication and/or record the time that the authentication password was received. In the event that the authentication server receives the second authentication request, the authentication server searches to determine whether an authentication password matching the authentication password obtained from the second authentication request is stored (e.g., at the authentication server). If an authentication password that matches the authentication password obtained from the second authentication request does not exist, or if an authentication password that matches the authentication password obtained from the second authentication request exists but has an associated duration of validity that is set in advance as T, but the difference between the time when authentication password was received (e.g., when the second authentication request is received) and the time at which the authentication password was generated exceeds a certain threshold value (e.g., T), then the authentication password (e.g., the authentication password obtained from the second authentication request) is determined to be invalid (or to have become invalid if the authentication password expired). In other words, if an authentication request for the authentication password is not received within time T from the time when the authentication server generated the authentication password, the authentication password is determined to have become invalid.

In some embodiments, in the event that the second authentication is successful, use of the authentication password is discontinued. For example, the authentication password can be set as invalid in order to avoid wasting storage resources. The authentication server can set an authentication password as invalid in response to the authentication password being validated in connection with an authentication request.

In some embodiments, the devices can be implemented in the same or different programming languages. For example, an authentication server can be implemented using a Java language, a client (e.g., a SOCKS5 client) can be implemented using C++ language, and a proxy server (e.g., a SOCKS5 proxy server) can be implemented using C language.

Figure 3:
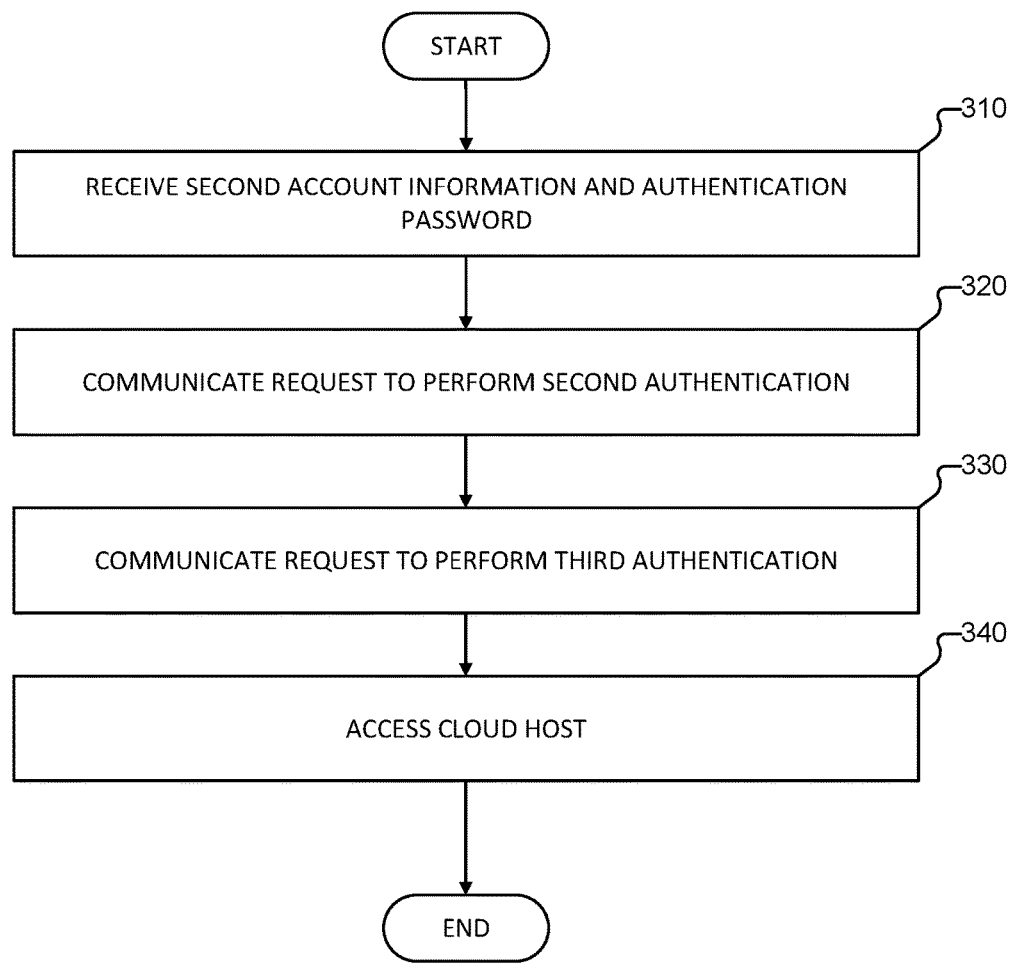
FIG. 3 is a flowchart of an access control method for cloud hosting services according to various embodiments of the present disclosure.

FIG. 3 is a flowchart of an access control method for cloud hosting services according to various embodiments of the present disclosure.

Referring to FIG. 3, process 300 for access control for cloud hosting services is provided. Process 300 can be implemented by a device such as a computing device. In some embodiments, process 300 is implemented by a proxy server. Process 300 can be implemented by device 600 of FIG. 6, system 800 of FIG. 8, and/or computer system 900 of FIG. 9.

At 310, second account information and an authentication password are received. In some embodiments, the proxy server receives the second account information and an authentication password is received. The second account information and an authentication password can be communicated in connection with an authentication request. The proxy server can receive the second account information and authentication password from the client. In some embodiments, the client receives the authentication password from the authentication server in response to the first authentication of the first business information of the software vendor being determined to be successful.

At 320, a request to perform a second authentication is communicated. In some embodiments, the proxy server communicates the request to perform the second authentication to the authentication server. The request to perform the second authentication can correspond to the second authentication request of process 100 of FIG. 1. The request to perform a second authentication can correspond to a request of the authentication server to perform a second authentication based at least in part on the authentication password. For example, the authentication password can be included in the request to perform the second authentication.

At 330, a request to perform a third authentication is communicated. In some embodiments, the proxy server communicates the request to perform the third authentication to the cloud host. The proxy server can communicate the request to perform the third authentication upon the proxy server receiving notification from the authentication server that the second authentication was successful. The request to perform the third authentication can correspond to a request of the cloud host to perform a third authentication of the second account information.

At 340, the cloud host is accessed. In some embodiments, the proxy server accesses the cloud host on behalf of the client (e.g., as a proxy for the client). The accessing of the cloud host by the proxy server can correspond to an access to a service and/or resource deployed (e.g., hosted) on the cloud host. The proxy server can access the service and/or resource deployed on the cloud host in the event that third authentication is successful. In some embodiments, the proxy server receives a notification from the cloud host that the third authentication is successful. The proxy server can send a notification to the client indicating that the third authentication is successful. In the event that the third authentication is successful, the proxy server can access the service and/or resource deployed on the cloud host based on an instruction or request received from the client (e.g., prior to the authentication process, or after the authentication process is complete), and sends a response/results from the cloud host to the client.

In some embodiments, the client requests the authentication server to perform a first authentication of the first account information of the software vendor; the client transmits the authentication password returned by the authentication server after the first authentication is successful to the proxy server; the proxy server requests the authentication server to perform a second authentication of the authentication password; when the second authentication is successful, the client, via the proxy server, requests the cloud host to perform a third authentication of its second account information and, when this third authentication is successful, the client can access the service resources deployed on the cloud host via the proxy server. In some embodiments, the proxy server accesses the cloud host based at least in part on the configuration on the cloud host. An example of configurations on the cloud host through which the proxy server accesses the cloud host includes a configuration of the cloud host's security group rule to allow the proxy servers' pubic network IP address to access the service in the cloud host. Before the proxy server accesses the cloud host, the authentication process performs three rounds of authentication (e.g., authentication of the software vendor's account, authentication of the authentication password, and authentication of the client's account), thereby substantially strengthening the security of the cloud hosting services and the account system of the cloud host itself.

In some embodiments, the proxy server can generate and record an access log corresponding to a current visit (e.g., access attempt or successful access) of the client to the cloud host. Accordingly, an access log can be maintained for each access of the client to the cloud host. For example, process 300 can include generating and recording an access log for the current visit by the client to the cloud host. In some embodiments, in the event that the proxy server accesses the cloud host, an access log corresponding to the current visit is recorded. The recording of the access log can ensure the reliability of the access log and prevent the occurrence of data leaks.

In some embodiments, the accessing of the cloud host (340 of process 300 of FIG. 3) includes communicating a service resource access request to the cloud host. The service resource access request can include the address of the cloud hosting service and the IP address of the proxy server.

In some embodiments, the accessing of the cloud host (340 of process 300 of FIG. 3) includes receiving the data associated with the service resource access request returned by the cloud host after the IP address of the proxy server is identified.

In some embodiments, the proxy server communicates a service resource access request to the address of the cloud hosting service that needs to be accessed (e.g., the address of the cloud hosting service associated with an access request that is received from the client). The service resource access request can include the IP address of the proxy server in order to facilitate the cloud host's return of data in accordance with the IP address of the proxy server. The cloud host can communicate data corresponding to the service resource access request to the proxy server (e.g., to the IP address of the proxy server). For example, the data returned by the cloud host based on the service resource access request is returned to the proxy server at the IP address of the proxy server. The proxy server can forward information associated with the data returned by the cloud host.

Figure 4:
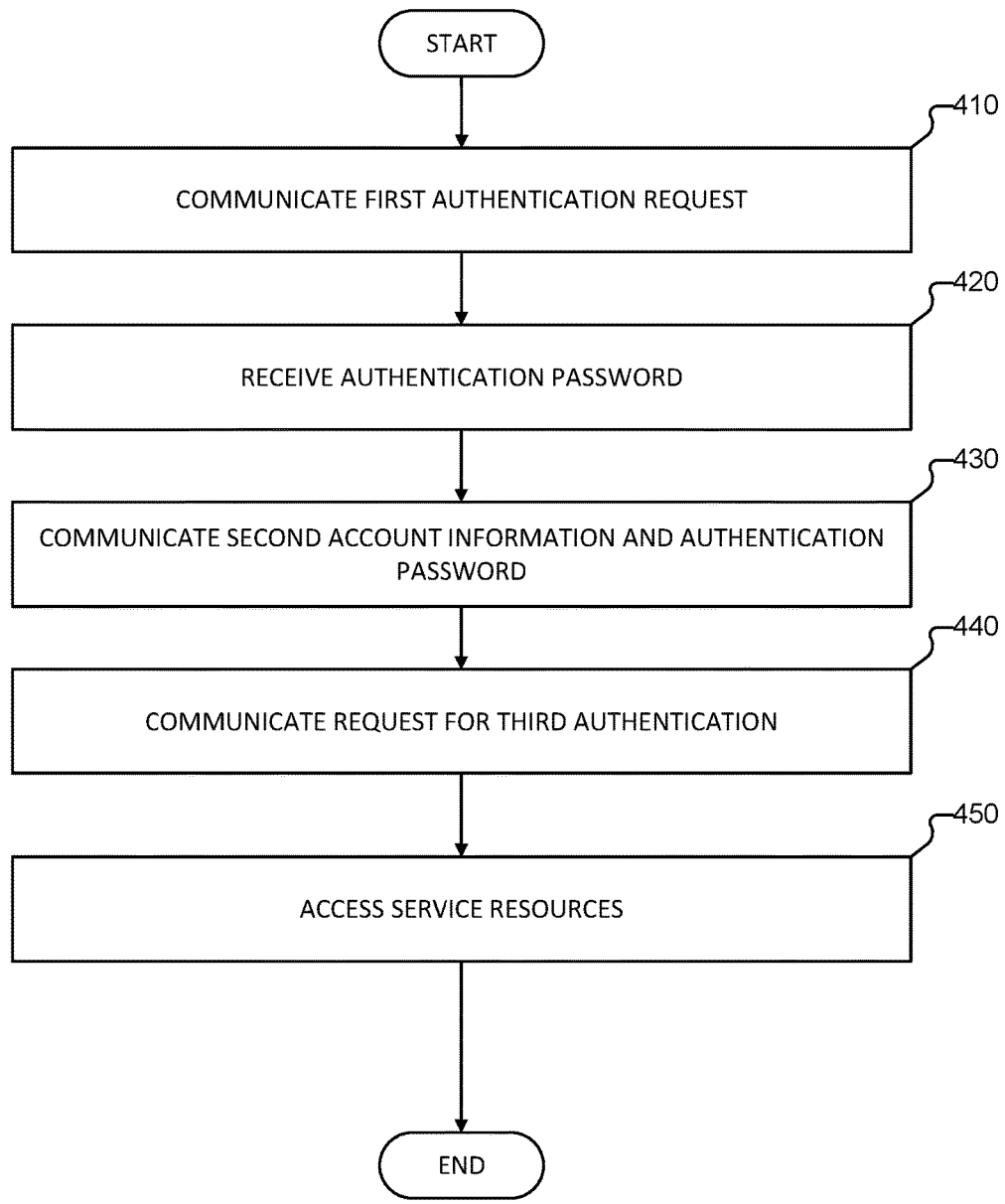
FIG. 4 is a flowchart of an access control method for cloud hosting services according to various embodiments of the present disclosure.

FIG. 4 is a flowchart of an access control method for cloud hosting services according to various embodiments of the present disclosure.

Referring to FIG. 4, process 400 for access control for cloud hosting services is provided. Process 400 can be implemented by a device such as a computing device. In some embodiments, process 400 is implemented by a client. Process 400 can be implemented by device 700 of FIG. 7, system 800 of FIG. 8, and/or computer system 900 of FIG. 9.

At 410, a first authentication request is communicated. The first authentication request can be communicated by the client. In some embodiments, the client communicates the first authentication request to an authentication server. The first authentication request can include the first account information of the software vendor.

At 420, an authentication password is received. The client can receive the authentication password. In some embodiments, the authentication password is returned by the authentication server in response to the first authentication request being communicated to the authentication server. For example, the authentication password can be returned to the client after the authentication server has successfully performed the first authentication of the first account information.

At 430, second account information and the authentication password are communicated. In some embodiments, the second account information corresponds to account information of the client. The client can communicate the second account information of the client and the authentication password to the proxy server. For example, the client can communicate the second account information and the authentication password to the proxy server in connection with the second authentication. For example, the proxy server can request the authentication server to perform the second authentication of the authentication password. A notification that authentication of the password is successful can be communicated to the client (e.g., from the proxy server or from the authentication server via the proxy server).

At 440, a request to perform a third authentication is communicated. In some embodiments, in response to receiving notification that the second authentication is successful, the client can communicate a request to perform the third authentication. For example, the client can communicate the request to perform the third authentication to the cloud host. The request to perform the third authentication can correspond to a request for authentication of the second account information. The client can communicate the request to perform the third authentication to the cloud host via the proxy server. A notification that authentication of the second account information is successful can be communicated to the client (e.g., from the proxy server or from the authentication server via the proxy server).

At 450, service resources are accessed. In some embodiments, the client can access service resources deployed (e.g., hosted on) the cloud host. The client can access the service resources deployed on the cloud host via the proxy server. In some embodiments, the client can access the service resources deployed on the cloud host in the event that the third authentication is successful. For example, the client can access the service resources upon receiving notification that the third authentication is successful.

In the embodiments of the present application, the client requests the authentication server to perform a first authentication of the first account information of the software vendor; the client transmits the authentication password returned by the authentication server after the first authentication is successful to the proxy server; the proxy server requests the authentication server to perform a second authentication of the authentication password; when the second authentication is successful, via the proxy server, the client requests the cloud host to perform a third authentication of its second account information and, when the third authentication of the second account information of the client is successful, the client can access the service resources deployed on the cloud host via the proxy server. In some embodiments, the proxy server accesses the cloud host through configurations on the cloud host, and before the proxy server accesses the cloud host, the process undergoes three rounds of authentication (e.g., authentication of the software vendor's account, authentication of the authentication password, and authentication of the client's account), thereby substantially strengthening the security of the cloud hosting services and the account system of the cloud host itself.

Referring back to FIG. 2, process 200 for access control for cloud hosting services is provided. Process 200 can include a process for authenticating a client and for a client to access service resources deployed by a cloud host.

At 250, a cloud host is configured. In some embodiments, the proxy server is a SOCKS5 proxy server. The proxy server can have a public network IP. In some embodiments, a system administrator 210 configures the cloud host security groups, and the public network IP of the proxy server 220 (e.g., the SOCKS5 proxy server) accesses the cloud host 215.

At 255, an authentication server 230 is deployed. In some embodiments, the system administrator 210 configures the authentication server 230. For example, the system administrator 210 can configure a number of privilege records based on businesses and users (e.g., users affiliated with the businesses) that are able to access service resources deployed on the cloud host 215. In some embodiments, the structure of each privilege record can comprise a triad of information (e.g., a business account, a cloud hosting service address, and a service account) that indicates that one business account has access privileges to one service account at one cloud hosting service address (e.g., an IP address plus port number).

At 260, a client 225 communicates an authentication request to the authentication server 230. In some embodiments, the client 225 is a SOCKS5 client. The authentication request communicated by client 225 to authentication server 230 can correspond to the first authentication request of 110 of process 100 of FIG. 1. The authentication request can include a business account name, a password (or a token or the like), a cloud hosting service address, and a service account number. A user can input the business name, password, cloud hosting service address, and the service account number (e.g., via a graphical user interface, or the like). For example, the user can be an administrator of the ISV and can have access to the business account name and password. In some embodiments, the information included in the authentication request is stored and the authentication request is generated by an application based on, for example, a request input by the administrator. The authentication server 230 determines whether the account name and password are valid. For example, authentication server 230 determines whether the account name and the password included in the authentication request match an account name and corresponding password stored in an accounts database locally at authentication server 230 or stored remotely. For example, authentication server 230 determines whether the account has access privileges based on the privilege records configured at 255.

At 265, a token is obtained and communicated to client 225. For example, the token can correspond to the authentication password of 130 of process 100 of FIG. 1. In the event that authentication at 260 is successful, authentication server 230 can generate a token. Authentication server 230 can set a valid period associated with the token or a time at which the token expires. Authentication server 230 can communicate the token to client 225. In some embodiments, authentication server 230 stores the token and the associated valid period or a time at which the token expires. The valid period associated with the token can be represented as T and can be stored in units of seconds, minutes, hours, days, or another unit of time.

At 270, client 225 (e.g., SOCKS5 client) communicates a request to proxy server 220 (e.g., SOCKS5 proxy server). The request communicated from client 225 to proxy server 220 can include a cloud hosting service address, a service account number, a token, etc. The token included in the request can correspond to the token that client 225 received from authentication server 230 at 265.

At 275, proxy server 220 (e.g., SOCKS5 proxy server) communicates a request to authentication server 230. The request communicated by proxy server 220 to authentication server 230 can include the token included in the request of 270. In response to receiving the request, the authentication server 230 can perform an authentication. For example, the authentication server 230 can verify the token. In the event that the request for authentication or the authentication of the token is within the validity period, for example, a period of T seconds, (e.g., a period during which the token is deemed to be valid or has not expired), the token authentication is deemed valid. Otherwise, in the event that the request for authentication or the authentication of the token authentication is not within the validity period, the token authentication is invalid (e.g., the token is deemed to be invalid or to have expired).

At 280, a service resource or other resource deployed on (e.g., hosted by) cloud host 215 is accessed. In the event that the verification of 275 is successful, authentication server 230 makes the token invalid. For example, in response to successful authentication (e.g., of the token) at 275, authentication server 230 makes the token invalid. Authentication server 230 can make the token invalid by editing a record associated with the token so as to indicate that the token is not valid. In some embodiments, making the token invalid includes the authentication server 230 deleting a record corresponding to the token. In some embodiments, making the token invalid includes the authentication server 230 modifying metadata associated with the token or a record of the token. In the event that authentication at 275 is successful, proxy server 220 (e.g., the SOCKS5 proxy server) records a service access log and initiates a request to the cloud hosting service address (e.g., the cloud service address received at 270). The request communicated by proxy server 220 to cloud host 215 can include a service account number (e.g., the service account number received at 270). The request communicated by proxy server 220 to cloud host 215 can be communicated in connection with (e.g., along with) an access request to a service resource or other resource deployed on (e.g., hosted by) cloud host 215. Cloud host 215 (e.g., cloud hosting service) authenticates information in the request communicated by proxy server 220 to cloud host 215. For example, cloud host 215 verifies whether the service account is valid.

At 285, proxy server 220 updates an access database (e.g., with an access log entry). For example, proxy server 220 (e.g., the SOCKS5 proxy server) records an access log. In some embodiments, the access log includes one or more of a business account number, a cloud hosting service address, and a service account number. The access log can further include an indication of the specific service resource or other resource associated with the request, or a plurality of service resources and/or other resources accessed by client 225 (e.g., via proxy server 220). The access database can be local to proxy server 220 or remote in relation to proxy server 220 (e.g., proxy server can access the access database via a network).

In some embodiments, the client requests the authentication server to perform a first authentication of the first account information of the software vendor; the client transmits the authentication password returned by the authentication server when the first authentication is successful to the proxy server; the proxy server requests the authentication server to perform a second authentication of the authentication password; when the second authentication is successful, the client, via the proxy server, requests the cloud host to perform a third authentication of the second account information and, when it is successful, can access the service resources deployed on the cloud host via the proxy server. In some embodiments, the proxy server accesses the cloud host through configurations on the cloud host, and before the proxy server accesses the cloud host, the process undergoes at least three rounds of authentication (e.g., an authentication of the software vendor's account, an authentication of the authentication password or token, and authorization of the client's account), thereby substantially strengthening the security of the cloud hosting services and the account system of the cloud host itself.

In some embodiments, multiple groups of correspondingly saved pieces of first account information, second account information and cloud hosting service addresses are configured on the authentication server. For example, access privileges to one cloud hosting service address available to access are configured targeting one group of first account information and second account information, which makes it possible to realize privilege controls having greater flexibility and granularity.

In some embodiments, after accessing the cloud host (or contemporaneous with an access of the cloud host), the proxy server records an access log corresponding to the current visit, ensuring the reliability of the access log and preventing the occurrence of data leaks. The access log can record the fact that an access has been attempted or performed, and/or specific information relating to the access, including one or more service resources and/or other resources accessed by the client.

Figure 5:
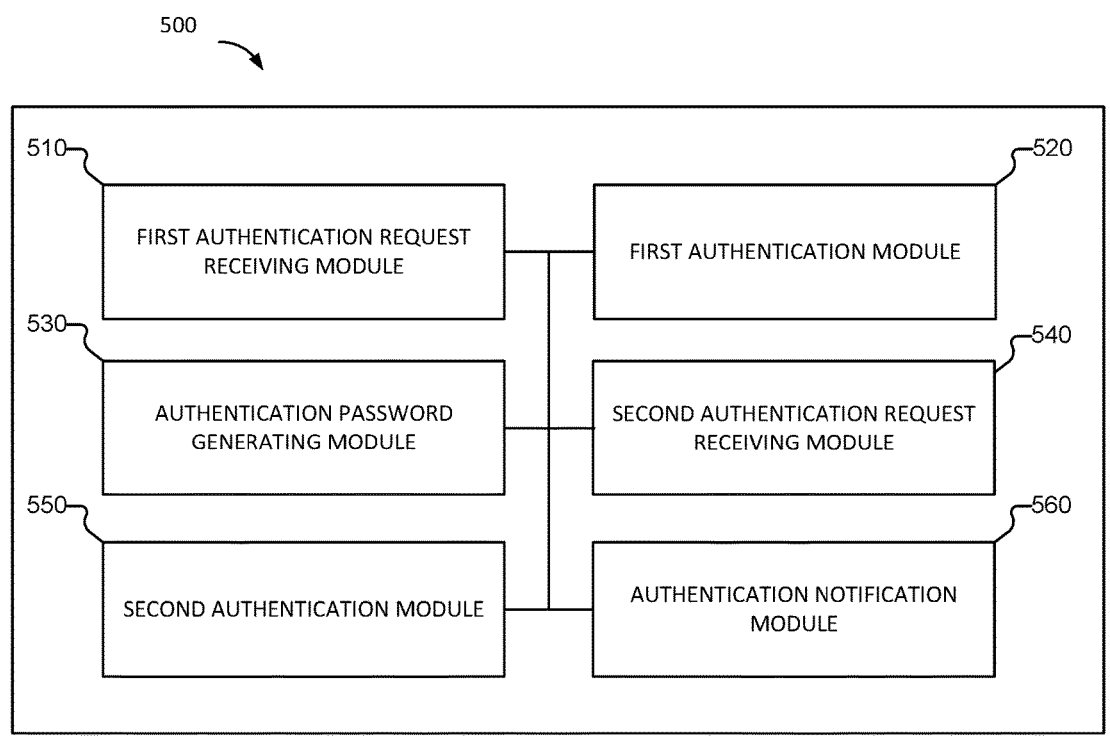
FIG. 5 is a block diagram of an access control device for cloud hosting services according to various embodiments of the present disclosure.

FIG. 5 is a block diagram of an access control device for cloud hosting services according to various embodiments of the present disclosure.

Referring to FIG. 5, device 500 for cloud hosting services is provided. Device 500 can be implemented by a device such as a computing device. For example, device 500 can be implemented by computer system 900 of FIG. 9. In some embodiments, device 500 is an authenticating server. Device 500 can implement process 100 of FIG. 1. Device 500 can be implemented in system 800 of FIG. 8.

Device 500 can include a first authentication request receiving module 510, a first authentication module 520, an authentication password generating module 530, a second authentication request receiving module 540, a second authentication module 550, and an authentication notification module 560. Device 500 can communicate with a client over a network.

The first authentication request receiving module 510 is configured to receive the first authentication request transmitted by the client. In some embodiments, the first authentication request comprises the first account information of a software vendor. In some embodiments, the software vendor corresponds to the vendor associated with a service for which the authentication server is to authenticate the client (e.g., based at least in part on the first authentication request). The first account information can include an identifier (e.g., a login identifier, a user identifier, an account identifier, etc.), a password, a token, the like, or any combination thereof.

The first authentication module 520 is configured to perform authentication. In some embodiments, the first authentication module 520 is configured to perform the first authentication of the first account information. In some embodiments, first account information can be obtained (e.g., extracted) from the first authentication request. The first authentication module 520 can perform the first authentication using at least the first account information. The first authentication module 520 can also use account information associated with an account (e.g., the client); such account information can be obtained from an account database that is stored either locally at device 500 or remotely located relative to device 500.

The authentication password generating module 530 is configured to generate an authentication password (e.g., a token, or the like). The authentication password generating module 530 can generate the authentication password in the event that the first authentication is successful. The authentication password generating module 530 can transmit the authentication password to the client.

The second authentication request receiving module 540 is configured to receive a second authentication request. The second authentication request can be transmitted by the proxy server accessing the cloud host on behalf of the client. In some embodiments, the second authentication request includes the authentication password. For example, the authentication password can be transmitted to the proxy server by the client. In some embodiments, the second authentication request can further include account information or an identifier associated with the account for which authentication in connection with access of a service is requested.

The second authentication module 550 is configured to perform authentication. In some embodiments, the second authentication module 550 performs a second authentication of the authentication password. The authentication server can perform the second authentication using at least the authentication password associated with the second authentication request.

The authentication notification module 560 is configured to communicate a notification associated with a result of the second authentication. In some embodiments, the authentication notification module 560 communicates the notification in the event that second authentication is successful. For example, the authentication notification module 560 notifies the proxy server. The authentication notification module 560 can notify the proxy server of the second authentication being successful so that the proxy server can request the cloud host to perform a third authentication of the second account information of the client and, in the event that the third authentication is successful, the client accesses the service resources and/or other resources deployed on the cloud host via the proxy server.

In some embodiments, the first account information is the business account information used by the software vendor on an electronic transaction platform that is providing the cloud host.

In some embodiments, the second account information is the service account information used by the client when accessing the services deployed by the software vendor on the cloud host.

In some embodiments, the first authentication request further includes service account information and the address of the cloud hosting service to which access is being requested.

In some embodiments, device 500 further includes a privilege information extraction module. The privilege information extraction module can be configured to extract privilege information from the first authentication request. The privilege information extraction module can be used before generating an authentication password and communicating the authentication password to the client. The privilege information extraction module can extract privilege information from the first authentication request. The privilege information can include the first account information, second account information, and the address of the cloud hosting service.

In some embodiments, device 500 further includes a privilege comparison module. The privilege comparison module is configured to compare the extracted privilege information against preset privilege records. The privilege comparison module is configured to determine whether the comparison results are consistent (e.g., match). The privilege records can comprise multiple groups of correspondingly saved pieces of first information, second information, and cloud hosting service addresses.

In some embodiments, the communication between the client and the said proxy server is carried out at the session layer based on the proxy protocol. As an example, the proxy protocol can be SOCKS5. Socket Secure (SOCKS) is an Internet protocol that exchanges network packets between a client and server through a proxy server. SOCKS5 additionally provides authentication so only authorized users may access a server. SOCKS5 performs at the session layer of the OSI model.

In some embodiments, the second authentication module is configured to determine whether the authentication password is expired. In some embodiments, the second authentication module is configured to determine whether the time at which the authentication password is received is within a preset time period. If the authentication password that is received is within the preset time period, then authentication of the authentication password is successful. The preset time period can be stored in association with the authentication password. The preset time period can be a time period that is associated with a plurality of authentication passwords (e.g., all authentication passwords). In some embodiments, the preset time period can be set specifically for the authentication password.

In some embodiments, device 500 can include a password setting module. The password setting module can be configured to set the authentication password as invalid. For example, the password setting module can set the authentication password as invalid in the event that the second authentication is successful.

In some embodiments, the client requests the authentication server to perform a first authentication of the first account information of the software vendor; the client transmits the authentication password returned by the authentication server when the first authentication is successful to the proxy server; the proxy server requests the authentication server to perform a second authentication of the authentication password; when the second authentication is successful, the client, via the proxy server, requests the cloud host to perform a third authentication of its second account information, and when this is successful, can access the service resources deployed on the cloud host via the proxy server. In some embodiments, the proxy server accesses the cloud host through configurations on the cloud host, and before the proxy server accesses the cloud host, the process undergoes three rounds of authentication (authentication of the software vendor's account, password authentication, and authentication of the client's account), thereby substantially strengthening the security of the cloud hosting services and the account system of the cloud host itself.

In some embodiments, multiple groups of correspondingly saved pieces of first account information, second account information, and addresses of cloud hosting services are configured (e., stored) on the authentication server. For example, access privileges to one cloud hosting service address available to access are configured for one group of first account information and second account information, which makes it possible to realize privilege controls having greater flexibility and granularity.

Figure 6:
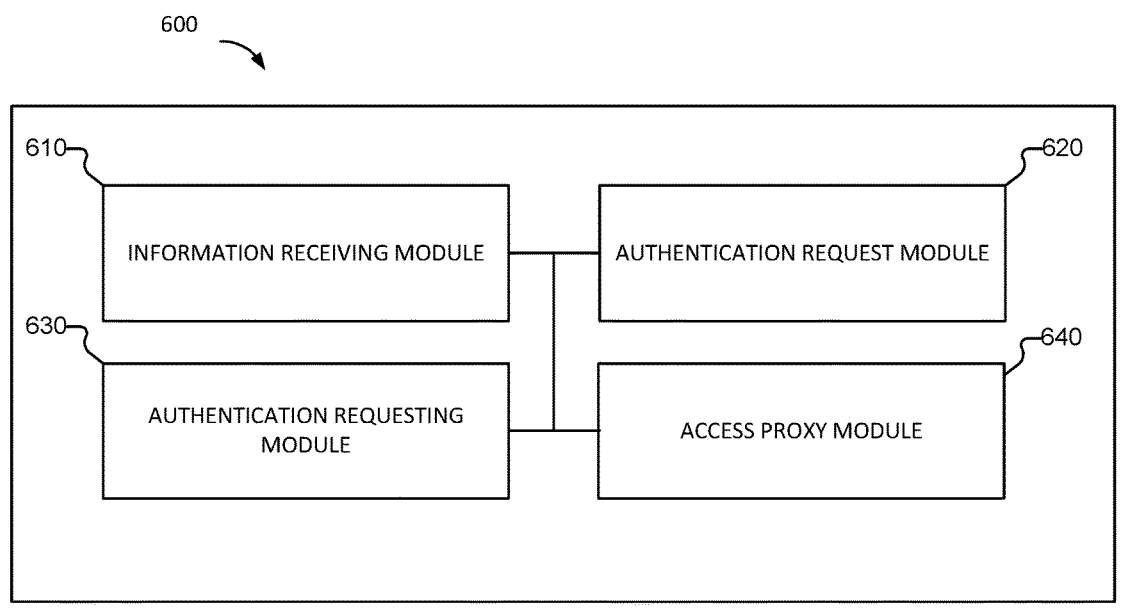
FIG. 6 is a block diagram of an access control device for cloud hosting services according to various embodiments of the present disclosure.

FIG. 6 is a block diagram of an access control device for cloud hosting services according to various embodiments of the present disclosure.

Referring to FIG. 6, device 600 for cloud hosting services is provided. Device 600 can be implemented by a device such as a computing device. For example, device 600 can be implemented by computer system 900 of FIG. 9. In some embodiments, device 600 is a proxy server. Device 600 can implement process 100 of FIG. 1. Device 600 can be implemented in system 800 of FIG. 8.

Device 600 can include an information receiving module 610, an authentication request module 620, an authentication requesting module 630, and an access proxy module 640.

The information receiving module 610 is configured to receive the second account information and authentication password. The second account information and authentication password can be transmitted to device 600 by the client. The second account information and an authentication password can be communicated in connection with an authentication request. The authentication password is transmitted to the client by the authentication server in the event that (e.g., in response to) the first authentication of the first business information of the software vendor is successful.

The authentication request module 620 is configured to request the authentication server to perform a second authentication. The request to perform a second authentication can correspond to a request of the authentication server to perform a second authentication based at least in part on the authentication password. For example, the authentication password can be included in the request to perform the second authentication The authentication requesting module 630 is configured to request the cloud host to perform a third authentication. For example, the request for the cloud host to perform a third authentication can include an authentication of the second account information. The authentication requesting module 630 can request the cloud host to perform a third authentication of the second account information in the event that (e.g., in response to) notification is received from the authentication server that the second authentication is successful.

The access proxy module 640 is configured to access a service resource and/or other resource deployed on (e.g., hosted by) the cloud host. For example, the access proxy module 640 accesses the service resources deployed on the cloud host on behalf of the client in the event that the third authentication is successful to access the service resources deployed on the cloud host on behalf of the client.

In some embodiments, device 600 comprises a log generating module.

The log generating module can be configured to generate and record an access log of the current visit by the client to the cloud host.

In some embodiments, the access proxy module 640 comprises a request transmitting module and a returned data receiving module.

The request transmitting module is configured to communicate a service resource access request to the cloud host. The accessing of the cloud host by the proxy server can correspond to an access to a service and/or resource deployed (e.g., hosted) on the cloud host. In some embodiments, the service resource access request includes the address of the cloud hosting service and the IP address of the proxy server.

The returned data receiving module is configured to receive the data regarding the service resource access request returned by the cloud host after identifying the IP address of the proxy server.

In some embodiments, the client requests the authentication server to perform a first authentication of the first account information of the software vendor; the client transmits the authentication password returned by the authentication server when the first authentication is successful to the proxy server; the proxy server requests the authentication server to perform a second authentication of the authentication password; when the second authentication is successful, the client, via the proxy server, requests the cloud host to perform a third authentication of its second account information, and when this is successful, is able to access the service resources deployed on the cloud host via the proxy server. In some embodiments, configurations on the cloud host can be used in connection with the proxy server accessing the cloud host, and before the proxy server accesses the cloud host, the process undergoes three rounds of authentication (an authentication of the account of the software vendor, an authentication of the authentication password, and an authentication of the client's account), thereby substantially strengthening the security of the cloud hosting services and the account system of the cloud host itself.

In some embodiments, after accessing the cloud host, the proxy server (e.g., device 600) records an access log corresponding to the current visit, ensuring the reliability of the log and preventing the occurrence of data leaks.

Figure 7:
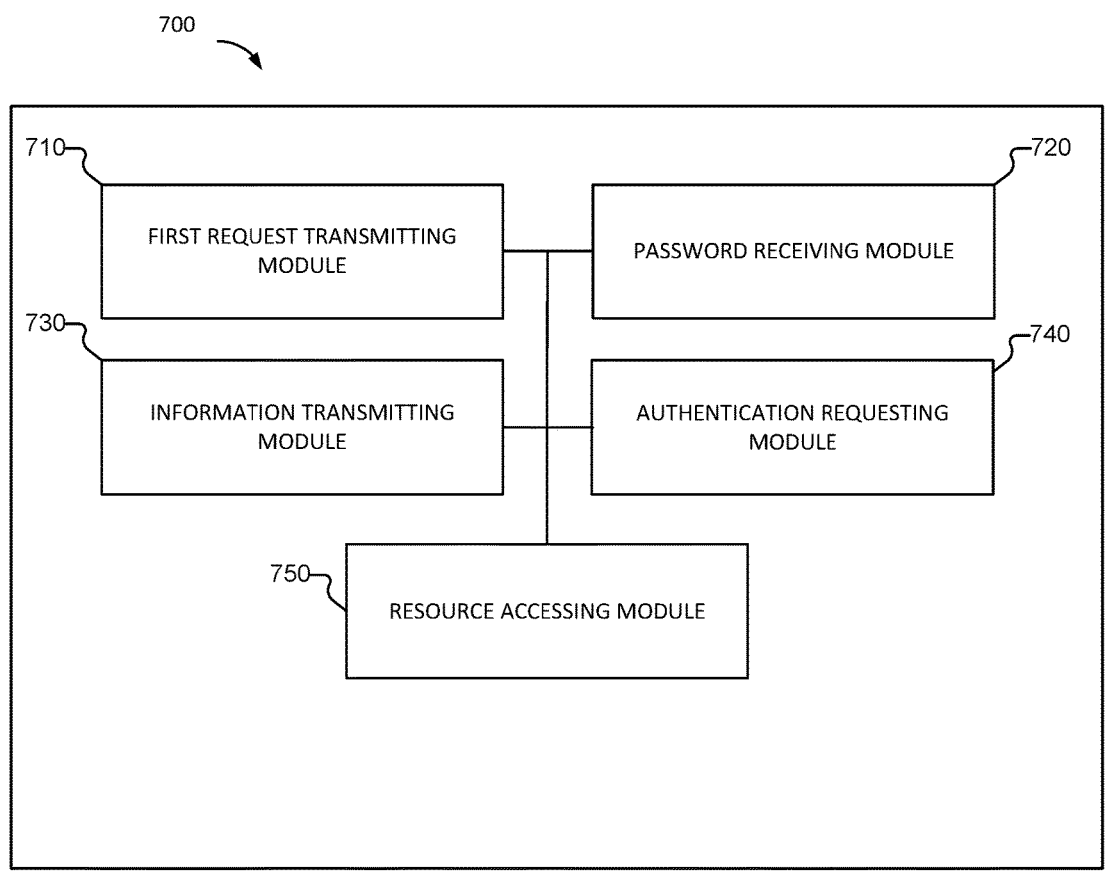
FIG. 7 is a block diagram of an access control device for cloud hosting services according to various embodiments of the present disclosure.

FIG. 7 is a block diagram of an access control device for cloud hosting services according to various embodiments of the present disclosure.

Referring to FIG. 7, device 700 for cloud hosting services is provided. Device 700 can be implemented by a device such as a computing device. For example, device 700 can be implemented by computer system 900 of FIG. 9. In some embodiments, device 700 is a client. Device 700 can implement process 100 of FIG. 1. Device 700 can be implemented in system 800 of FIG. 8.

Device 700 can include a first request transmitting module 710, a password receiving module 720, an information transmitting module 730, an authentication requesting module 740, and a resource accessing module 750.

The first request transmitting module 710 is configured to transmit the first authentication request to the authentication server. The first authentication request can include the first account information of the software vendor.

The password receiving module 720 is configured to receive the authentication password returned by the authentication server. For example, the authentication password can be returned to the authentication server in the event that the first authentication of the first account information is successful.

The information transmitting module 730 is configured to transmit the second account information of device 700 (e.g., the client) and the authentication password to the proxy server. For example, the second account information can be transmitted so that the proxy server can request the authentication server to perform a second authentication of the authentication password.

The authentication requesting module 740 is configured to request that a third authentication be performed. For example, in the event that a notification that indicates that the second authentication is successful, the authentication requesting module 740 can request the cloud host to perform a third authentication of the second account information.

The resource accessing module 750 is configured to access a service resource and/or other resource deployed on (e.g., hosted by) the cloud host. For example, the resource accessing module can access the service resource deployed on the cloud host in the event that the notification that indicates that the third authentication is successful is received. The resource accessing module 750 can access the service resources deployed on the cloud host via a proxy server.

In some embodiments, device 700 (e.g., the client) requests the authentication server to perform a first authentication of the first account information of the software vendor; device 700 (e.g., the client) transmits the authentication password returned by the authentication server when the first authentication is successful to the proxy server; the proxy server requests the authentication server to perform a second authentication of the authentication password; when the second authentication is successful, device 700 (e.g., the client), via the proxy server, requests the cloud host to perform a third authentication of its second account information, and when this is successful, can access the service resources deployed on the cloud host via the proxy server. In some embodiments, the proxy server accesses the cloud host based at least in part on (e.g., using) configurations of the cloud host, and before the proxy server accesses the cloud host, the process undergoes three rounds of authentication (e.g., an authentication of the account of the software vendor, an authentication of the authentication password, and an authentication of the client's account), thereby substantially strengthening the security of the cloud hosting service and the account system of the cloud host itself.

Figure 8:
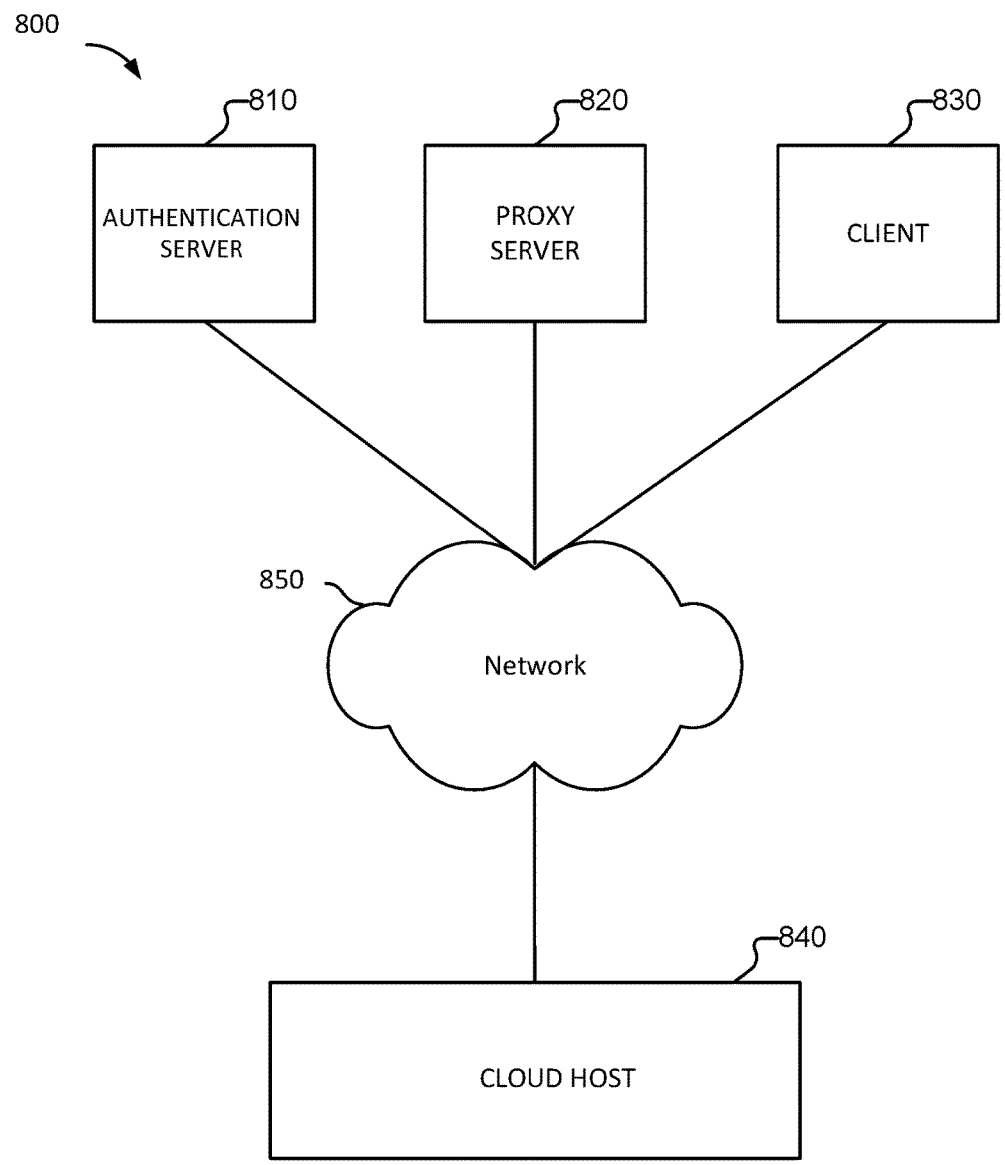
FIG. 8 is a block diagram of a system for cloud hosting services according to various embodiments of the present disclosure.

FIG. 8 is a block diagram of a system for cloud hosting services according to various embodiments of the present disclosure.

Referring to FIG. 8, system 800 for cloud hosting services is provided. System 800 can implement process 100 of FIG. 1, process 200 of FIG. 2, process 300 of FIG. 3, and/or process 400 of FIG. 4. System 800 can implement device 500 of FIG. 5, device 600 of FIG. 6, and/or device 700 of FIG. 7. System 800 can implement one or more computer systems 900 of FIG. 9.

System 800 can comprise an authentication server 810, a proxy server 820, a client 830, and a cloud host 840. System 800 can further comprise a network 850 over which one or more of the authentication server 810, the proxy server 820, the client 830, and the cloud host 840 communicate.

Authentication server 810 can correspond to device 500 of FIG. 5. In some embodiments, authentication server 810 can implement process 100 of FIG. 1.

Proxy server 820 can correspond to device 600 of FIG. 6. In some embodiments, proxy server 820 can implement process 300 of FIG. 3.

Client 830 can correspond to device 700 of FIG. 7. In some embodiments, client 830 can implement process 400 of FIG. 4.

In some embodiments, client 830 comprises a first request transmitting module (e.g., first request transmitting module 710 of device 700), an information transmitting module (e.g., information transmitting module 730 of device 700), a third authentication requesting module (e.g., authentication requesting module 740 of device 700), and a resource accessing module (e.g., resource accessing module 750 of device 700). Client 830 can further comprise a password receiving module.

The first request transmitting module can be configured to transmit a first authentication request to, for example, the authentication server. The first authentication request can include the first account information of the software vendor.

The information transmitting module can be configured to transmit the second account information of the client and the authentication password to the proxy server.

The third authentication requesting module can be configured to request that the cloud host perform a third authentication. For example, the third authentication requesting module can request the cloud host, via the proxy server, to perform the third authentication. The third authentication can correspond to an authentication of the second account information. The request to perform the third authentication can include the second account information. The third authentication requesting module can communicate the request to perform the third authentication in the event that a notification that the second authentication is successful is received.

The resource accessing module can be configured to access a service resource and/or other resource deployed on (e.g., hosted by), the cloud host. The resource accessing module can access the service resource and/or other resource deployed on the cloud host by using the proxy server. For example, the resource accessing module can send an access request to the cloud host via the proxy server. The resource accessing module can access the service resource and/or other resource in the event that a notification indicating that the third authentication is successful is received (e.g., from the cloud host).

Proxy server 820 can comprise a second authentication requesting module (e.g., authentication request module 620 of device 600) and an access proxy module (e.g., access proxy module 640 of device 600). Proxy server 820 can further comprise an information receiving module and/or a third authentication requesting module.

The second authentication requesting module can be configured to request the authentication server to perform a second authentication of the authentication password transmitted by client 830.

The access proxy module can be configured to access the service resources and/or other resources deployed on cloud host 840 on behalf of client 830.

Authentication server 810 can comprise a first authentication request receiving module (e.g., first authentication request receiving module 510 of device 500), an authentication password generating module (e.g., authentication password generating module 530 of device 500), and a second authentication module (e.g., second authentication module 550 of device 500). The authentication server can further comprise one or more of a first authentication module (e.g., first authentication module 520 of device 500), a second authentication request receiving module (e.g., second authentication request receiving module 540 of device 500), and an authentication notification module (e.g., authentication notification module 560 of device 500).

The first authentication module can be configured to perform the first authentication of the first account information based on the first authentication request transmitted by the client.

The authentication password generating module can be configured to generate an authentication password. The authentication password generating module can communicate the authentication password to client 830. The authentication server (e.g., the authentication password generating module) can generate and/or communicate the authentication password in the event that first authentication is successful.

The second authentication module can be configured to perform the second authentication. The second authentication module can be configure to perform the second authentication of the authentication password. For example, the second authentication module can perform the second authentication based on the second authentication request communicated by, for example, proxy server 820.

Cloud host 840 is configured to perform the third authentication of the second account information and to provide (e.g., via proxy server 820) the client access to service resources and/or other resources deployed on the cloud host.

In some embodiments, client 830 requests authentication server 810 to perform a first authentication of the first account information of the software vendor; client 830 transmits the authentication password returned by authentication server 810 in the event that the first authentication is successful to proxy server 820; proxy server 820 requests authentication server 810 to perform a second authentication of the authentication password; in the event that the second authentication is successful, client 830, via proxy server 820, requests cloud host 840 to perform a third authentication of the second account information, and in the event that the third authentication is successful, can access, via proxy server 820, the service resources deployed on cloud host 840 or a server associated with the cloud host 840. In some embodiments, proxy server 820 accesses cloud host 840 based at least in part on configurations (e.g., data stored on or configurations of cloud host 840). In some embodiments, before proxy server 820 accesses cloud host 840, the process undergoes three rounds of authentication (e.g., an authentication of the account of the software vendor, an authentication of the authentication password, and an authentication of the client's account), thereby substantially strengthening the security of the cloud hosting services and the account system of the cloud host itself.

In some embodiments, multiple groups of correspondingly saved pieces of first account information, second account information, and cloud hosting service addresses are configured on the authentication server. For example, access privileges to one cloud hosting service address available for access are configured for one group of first account information and second account information. The access privileges can be used as a basis for authenticating privilege information (e.g., account information) included in the first authentication request, thereby providing privilege controls having greater flexibility and granularity.

In some embodiments, after accessing the cloud host, the proxy server records an access log corresponding to the current visit, which can ensure the reliability of the access log, and prevent the occurrence of data leaks.

Figure 9:
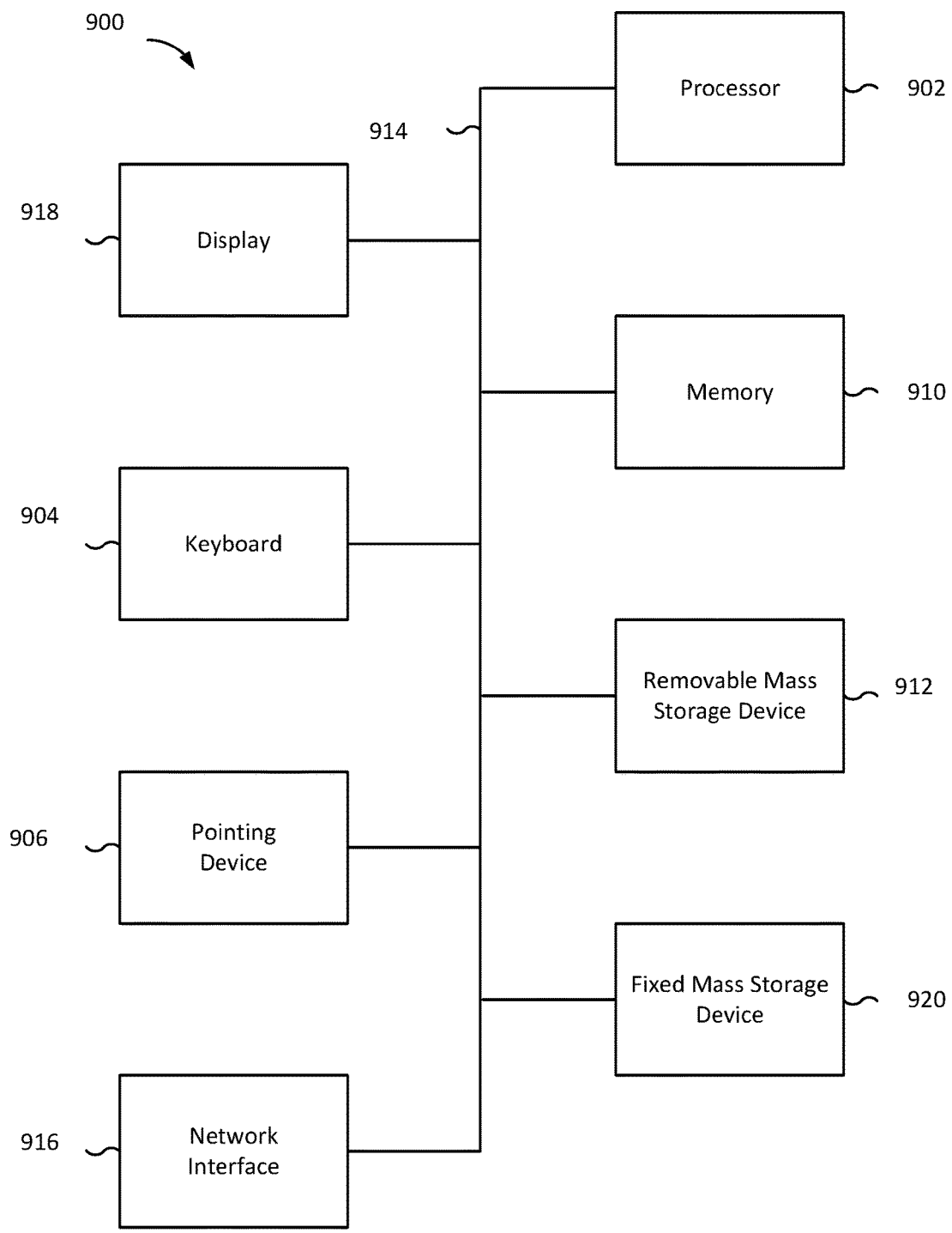
FIG. 9 is a functional diagram of a computer system for access control for cloud hosting services according to various embodiments of the present disclosure.

FIG. 9 is a functional diagram of a computer system for access control for cloud hosting services according to various embodiments of the present disclosure.

Referring to FIG. 9, a computer system 900 for access control for cloud hosting services is displayed. Computer system 900 can implement process 100 of FIG. 1, process 200 of FIG. 2, process 300 of FIG. 3, or process 400 of FIG. 4. Computer system 900 can implement device 500 of FIG. 5, device 600 of FIG. 6, device 700 of FIG. 7, or system 800 of FIG. 8. As will be apparent, other computer system architectures and configurations can be used to implement a display interface. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918).

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 902 to perform its functions (e.g., programmed instructions). For example, memory 910 can include any suitable computer-readable storage media, described below, depending on whether, for example, data access needs to be bi-directional or unidirectional. For example, processor 902 can also directly and very rapidly retrieve and store frequently needed data in a cache memory (not shown). The memory can be a non-transitory computer-readable storage medium.

A removable mass storage device 912 provides additional data storage capacity for the computer system 900, and is coupled either bi-directionally (read/write) or uni-directionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storage device 912 and fixed mass storage 920 generally store additional programming instructions, data, and the like that typically are not in active use by the processor 902. It will be appreciated that the information retained within mass storage device 912 and fixed mass storage 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

The modules described as separate components may or may not be physically separate, and components displayed as modules may or may not be physical modules. They can be located in one place, or they can be distributed across multiple network modules. The embodiment schemes of the present embodiments can be realized by selecting part or all of the modules in accordance with actual need.

Furthermore, the functional modules in the various embodiments of the present invention can be integrated into one processor, or each module can have an independent physical existence, or two or more modules can be integrated into a single module. The aforesaid integrated modules can take the form of hardware, or they can take the form of hardware combined with software function modules.

Each of the embodiments contained in this description is described in a progressive manner, the explanation of each embodiment focuses on areas of difference from the other embodiments, and the descriptions thereof may be mutually referenced for portions of each embodiment that are identical or similar.

Persons skilled in the art should understand that the embodiments of the present application can be offered as a method, a device, or a computer program product. Therefore, the embodiments of the present application may take the form of embodiments that are entirely hardware, embodiments that are entirely software, and embodiments that combine hardware and software aspects. Moreover, embodiments of the present application may employ one or more forms of computer products that implement computer-operable storage media (including but not limited to magnetic disk storage devices, CD-ROMs, and optical storage devices) containing computer-operable computer code.

In one typical configuration, said computer equipment comprises one or more processors (CPUs), input/output interfaces, network interfaces, and internal memory. Internal memory may include such forms as volatile memory in a computer-readable medium, random access memory (RAM), and/or non-volatile internal memory, such as read-only memory (ROM) or flash memory (flash RAM). Internal memory is an example of a computer-readable medium. Computer-readable media, including permanent and non-permanent, removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digital multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include transitory computer-readable media, (transitory media), such as modulated data signals and carrier waves.

The embodiments of the present application are described with reference to flowcharts and/or block diagrams based on methods, terminal equipment (systems), and computer program products of the embodiments of the present application. It should be understood that each flowchart and/or block diagram within the flowcharts and/or block diagrams and combinations of processes and/or blocks within the flowcharts and/or block diagrams can be realized by computer program commands. These computer program commands can be provided to general purpose computers, imbedded processors, or other programmable data processing terminal equipment to give rise to a machine, such that the commands executed by the computer or other programmable data processing terminal equipment produces a device used to implement the functions specified in one or more processes in the flowcharts and/or one or more blocks in the block diagrams.

These computer program commands can also be stored in computer-readable memory that can guide the computers or other programmable data processing terminal equipment to operate in a specific manner. As a result, the commands stored in the computer-readable memory give rise to products including command devices. These command devices implement the functions specified in one or more processes in the flowcharts and/or one or more blocks in the block diagrams.

These computer program commands can also be loaded onto computers or other programmable data processing terminal equipment and made to execute a series of steps on the computers or other programmable data processing terminal equipment so as to give rise to computer-implemented processing. The commands executed on the computers or other programmable data processing terminal equipment thereby provide the steps of the functions specified in one or more processes in the flowcharts and/or one or more blocks in the block diagrams.

Although preferred embodiments of the present application have already been described, a person skilled in the art can make other modifications or revisions to these embodiments once he grasps the basic creative concept. Therefore, the attached claims are to be interpreted as including the preferred embodiments as well as all modifications and revisions falling within the scope of the embodiments of the present application.

Lastly, it must also be explained that, in this document, relational terms such as "first" or "second" are used only to differentiate between one entity or operation and another entity or operation, without necessitating or implying that there is any such actual relationship or sequence between these entities or operations. Moreover, the term "comprise" or "contain" or any of their variants are to be taken in their non-exclusive sense. Thus, processes, methods, things, or terminal devices that comprise a series of elements not only comprise those elements, but also comprise other elements that have not been explicitly listed or elements that are intrinsic to such processes, methods, things, or terminal devices. In the absence of further limitations, elements that are limited by the phrase "comprises a(n) . . . " do not exclude the existence of additional identical elements in processes, methods, things, or terminal devices that comprise said elements.

The above is a detailed overview of an access control method, device, and system for cloud hosting services offered in the present application. This document has employed specific examples to expound the principles and implementation methods of the present application. The above descriptions of the embodiments are merely intended to aid in understanding the methodology and core ideas of the present invention; at the same time, persons with ordinary skill in the art are likely to make modifications in some areas based on the ideas of the present application; to summarize, the content of this specification should not be understood to limit the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving, by one or more servers, a first authentication request from a client, wherein the first authentication request comprises first account information, and the first account information pertains to a business account that is associated with one or more user accounts;

performing, by the one or more servers, a first authentication of the first account information;

in response to a determination that the first authentication is successful, generating, by the one or more servers, an authentication password and communicating the authentication password to the client;

receiving, by the one or more servers, a second authentication request from a proxy server, wherein the second authentication request comprises the authentication password transmitted to the proxy server by the client, wherein the proxy server is a proxy for the client in connection with accessing a cloud host;

performing, by the one or more servers, a second authentication of the authentication password; and in response to a determination that the second authentication is successful, notifying the proxy server of an indication that the second authentication succeeded and causing the proxy server to request the cloud host to perform a third authentication of second account information, and in response to a determination that the third authentication is successful, causing the client to access one or more service resources deployed on the cloud host via the proxy server, wherein the second account information pertains to one of the one or more user accounts associated with the business account, and wherein one or more of the first authentication of the first account information and the third authentication of the second account information comprises:

obtaining information associated with a privilege record corresponding to the business account or the one of the one or more user accounts, the privileged record comprising a mapping of the one or more user accounts to the business account; and authenticating the client based at least in part on one or more of the information associated with the privilege record, and the first account information or the second account information.

2. The method of claim 1, wherein the first account information is associated with a software vendor providing a service on the cloud host.

3. The method of claim 1, wherein:

the first account information includes business account information used by a software vendor providing a service on the cloud host; and the second account information includes service account information used by the client in connection with accessing services deployed by the software vendor on the cloud host.

4. The method of claim 1, wherein the first authentication request further comprises the second account information and an address associated with the one or more service resources deployed on the cloud host; and wherein before the authentication password is generated and communicated to the client, the method further comprises:

extracting privilege information from the first authentication request, the privilege information comprising the first account information, the second account information, and the address associated with the one or more service resources;

comparing the privilege information with one or more preset privilege records; and determining that the privilege information matches at least one of the one or more preset privilege records, wherein the one or more preset privilege records comprise multiple groups of correspondingly saved pieces of first account information, second account information, and addresses of cloud hosting services.

5. The method of claim 1, wherein the client and the proxy server communicate at a session layer based on a proxy protocol.

6. The method of claim 1, wherein the performing of the second authentication of the authentication password comprises:

determining whether the authentication password is expired; and in response to a determination that the authentication password is not expired, determining that the second authentication of the authentication password is successful.

7. The method of claim 1, wherein in the event that the second authentication is successful, the method further comprises:

setting, by an authentication server, the authentication password as invalid.

8. A method, comprising:

receiving second account information and an authentication password from a client, wherein the authentication password was generated by the one or more servers and communicated to the client in response to a determination that an authentication server authenticates first account information;

requesting the authentication server to perform a second authentication of the authentication password;

receiving a notification indicating that the second authentication is successful;

in response to a determination that the notification indicates that the second authentication is successful, requesting a cloud host to perform a third authentication of the second account information; and in response to a determination that the third authentication is successful, accessing, on behalf of the client, one or more service resources deployed on the cloud host.

9. The method of claim 8, further comprising:

generating an access log to record a current visit by the client to the cloud host associated with the accessing of the one or more service resources; and wherein the accessing of the one or more service resources deployed on the cloud host comprises:

transmitting a service resource access request to the cloud host, wherein the service resource access request comprises an address of the one or more service resources deployed on the cloud host and an IP address of a proxy server; and receiving data returned by the cloud host associated with the service resource access request in response to a determination that the cloud host identified the IP address of the proxy server.

10. A method, comprising:

communicating a first authentication request to an authentication server, wherein the first authentication request comprises first account information and the first account information pertains to a business account that is associated with one or more user accounts;

receiving an authentication password from the authentication server in response to a determination that a first authentication of the first account information is successful;

transmitting second account information and the authentication password to a proxy server in connection with a request from the proxy server to the authentication server to perform a second authentication of the authentication password;

receiving a notification indicating that the second authentication is successful;

in response to receiving the notification indicating that the second authentication is successful, requesting a cloud host to perform a third authentication of the second account information;

receiving a notification indicating that the third authentication is successful; and in response to receiving the notification indicating that the third authentication is successful, accessing one or more service resources deployed on the cloud host via the proxy server, wherein the second account information pertains to one of the one or more user accounts associated with the business account, and wherein one or more of the first authentication of the first account information and the third authentication of the second account information is based at least in part of:

an authentication of the first account information or the second account information, and information associated with a privilege record corresponding to the business account or the one of the one or more user accounts, the privileged record comprising a mapping of the one or more user accounts to the business account.

11. An authentication server, comprising:
one or more processors configured to:
receive a first authentication request from a client, wherein the first authentication request comprises first account information, and the first account information pertains to a business account that is associated with one or more user accounts;
perform a first authentication of the first account information;
in response to a determination that the first authentication is successful, generate an authentication password and communicate the authentication password to the client;
receive a second authentication request from a proxy server, wherein the second authentication request comprises the authentication password transmitted to the proxy server by the client, wherein the proxy server is a proxy for the client in connection with accessing a cloud host;
perform a second authentication of the authentication password; and
in response to a determination that the second authentication is successful, notify the proxy server of an indication that the second authentication succeeded and cause the proxy server to request the cloud host to perform a third authentication of second account information, and in response to a determination that the third authentication is successful, cause the client to access one or more service resources deployed on the cloud host via the proxy server, wherein the second account information pertains to one of the one or more user accounts associated with the business account,
wherein one or more of the first authentication of the first account information and the third authentication of the second account information comprises:
obtaining information associated with a privilege record corresponding to the business account or the one of the one or more user accounts, the privileged record comprising a mapping of the one or more user accounts to the business account; and
authenticating the client based at least in part on one or more of the information associated with the privilege record, and the first account information or the second account information; and
a memory coupled to the one or more processors and configured to provide the one or more processors with instructions.

12. The authentication server of claim 11, wherein:
the first account information includes business account information used by a software vendor in an electronic transaction platform associated with the cloud host; and
the second account information includes service account information used by the client in connection with accessing services deployed by the software vendor on the cloud host.

13. The authentication server of claim 11, wherein the first authentication request further comprises the second account information and an address associated with the one or more service resources deployed on the cloud host; and
wherein the one or more processors are further configured to:
extract privilege information from the first authentication request, the privilege information comprising the first account information, the second account information, and the address associated with the one or more service resources;
compare the privilege information with one or more preset privilege records; and
determine that the privilege information matches at least one of the one or more preset privilege records, wherein the one or more preset privilege records comprise multiple groups of correspondingly saved pieces of first account information, second account information, and addresses of cloud hosting services.

14. The authentication server of claim 11, wherein the client and the proxy server communicate at a session layer based on a proxy protocol.

15. The authentication server of claim 11, wherein the performing of the second authentication of the authentication password comprises:
determining whether the authentication password is expired; and
in response to a determination that the authentication password is not expired, determining that the second authentication of the authentication password is successful.

16. The authentication server of claim 11, wherein the one or more processors are further configured to:
set the authentication password as invalid.

17. A proxy server, comprising:
one or more processors configured to:
receive second account information and an authentication password from a client, wherein the authentication password was generated by one or more servers and communicated to the client in response to a determination that an authentication server authenticates first account information;
request the authentication server to perform a second authentication of the authentication password;

receive a notification indicating that the second authentication is successful;

in response to a determination that the proxy server receives the notification indicating that the second authentication is successful, request a cloud host to perform a third authentication of the second account information, wherein the first account information pertains to a business account that is associated with one or more user accounts, and the second account information pertains to one of one or more user accounts associated with the business account; and in response to a determination that the third authentication is successful, access, on behalf of the client, one or more service resources deployed on the cloud host, wherein one or more of the authentication of the first account information and the third authentication is based at least in part of:

an authentication of the first account information or the second account information, and information associated with a privilege record corresponding to the business account or the one of the one or more user accounts, the privileged record comprising a mapping of the one or more user accounts to the business account; and a memory coupled to the one or more processors and configured to provide the one or more processors with instructions.

18. The proxy server of claim 17, wherein the one or more processors are further configured to generate an access log to record a current visit by the client to the cloud host associated with the accessing of the one or more service resources; and wherein to access the one or more service resources deployed on the cloud host comprises to:

transmit a service resource access request to the cloud host, wherein the service resource access request comprises an address of the one or more service resources deployed on the cloud host and an IP address of the proxy server; and receive data returned by the cloud host associated with the service resource access request in response to a determination that the cloud host identified the IP address of the proxy server.

19. A client, comprising:

one or more processors configured to:

communicate a first authentication request to an authentication server, wherein the first authentication request comprises first account information, and the first account information pertains to a business account that is associated with one or more user accounts;

receive an authentication password from the authentication server in response to a determination that a first authentication of the first account information is successful;

transmit second account information and the authentication password to a proxy server in connection with a request from the proxy server to the authentication server to perform a second authentication of the authentication password;

receive a notification indicating that the second authentication is successful;

in response to receiving the notification indicating that the second authentication is successful, request a cloud host to perform a third authentication of the second account information, wherein the second account information pertains to one of the one or more user accounts associated with the business account;

receive a notification indicating that the third authentication is successful; and in response to receiving the notification indicating that the third authentication is successful, access one or more service resources deployed on the cloud host via the proxy server, wherein one or more of the first authentication of the first account information and the third authentication of the second account information is based at least in part of:

an authentication of the first account information or the second account information, and information associated with a privilege record corresponding to the business account or the one of the one or more user accounts, the privileged record comprising a mapping of the one or more user accounts to the business account; and a memory coupled to the one or more processors and configured to provide the one or more processors with instructions.

20. A system, comprising:

a client, the client comprising:

one or more processors configured to:

communicate a first authentication request to an authentication server, wherein the first authentication request comprises first account information, and the first account information pertains to a business account that is associated with one or more user accounts;

receive an authentication password from the authentication server in response to a determination that a first authentication of the first account information is successful;

transmit second account information and the authentication password to a proxy server in connection with a request from the proxy server to the authentication server to perform a second authentication of the authentication password;

request a notification indicating that the second authentication is successful;

in response to receiving the notification indicating that the second authentication is successful, request a cloud host to perform a third authentication of the second account information, wherein the second account information pertains to one of the one or more user accounts associated with the business account;

receive a notification indicating that the third authentication is successful; and in response to receiving the notification indicating that the third authentication is successful, access one or more service resources deployed on the cloud host via the proxy server; and a memory coupled to the one or more processors and configured to provide the one or more processors with instructions;

a proxy, the proxy comprising:

one or more processors configured to:

receive second account information and the authentication password from the client, wherein the authentication password was generated by the authentication server and communicated to the client in response to a determination that the authentication server authenticates first account information;

request the authentication server to perform the second authentication of the authentication password;

receive, by the proxy server, the notification indicating that the second authentication is successful;

in response to a determination that the proxy server receives the notification indicating that the second authentication is successful, request the cloud host to perform the third authentication of the second account information; and in the event that the third authentication is successful, access, on behalf of the client, the one or more service resources deployed on the cloud host; and a memory coupled to the one or more processors and configured to provide the one or more processors with instructions; and the authentication server, the authentication server comprising:

one or more processors configured to:

receive the first authentication request from the client, wherein the first authentication request comprises first account information;

perform the first authentication of the first account information;

in response to a determination that the first authentication is successful, generate the authentication password and communicate the authentication password to the client;

receive a second authentication request from the proxy server, wherein the second authentication request comprises the authentication password transmitted to the proxy server by the client, wherein the proxy server is a proxy for the client in connection with accessing the cloud host;

perform the second authentication of the authentication password; and in response to a determination that the second authentication is successful, notify the proxy server of an indication that the second authentication succeeded and cause the proxy server to request the cloud host to perform the third authentication of the second account information, and in response to a determination that the third authentication is successful, cause the client to access the one or more service resources deployed on the cloud host via the proxy server, wherein one or more of the first authentication of the first account information and the third authentication of the second account information comprises:

obtaining information associated with a privilege record corresponding to the business account or the one of the one or more user accounts, the privileged record comprising a mapping of the one or more user accounts to the business account; and authenticating the client based at least in part on one or more of the information associated with the privilege record, and the first account information or the second account information; and a memory coupled to the one or more processors and configured to provide the one or more processors with instructions.

21. The method of claim 1, wherein:

the first account information corresponds to authentication information pertaining to an account for a software vendor; and the second account information corresponds to authentication information pertaining to an account for a client.

* * * * *